UNITED STATES PATENT OFFICE.

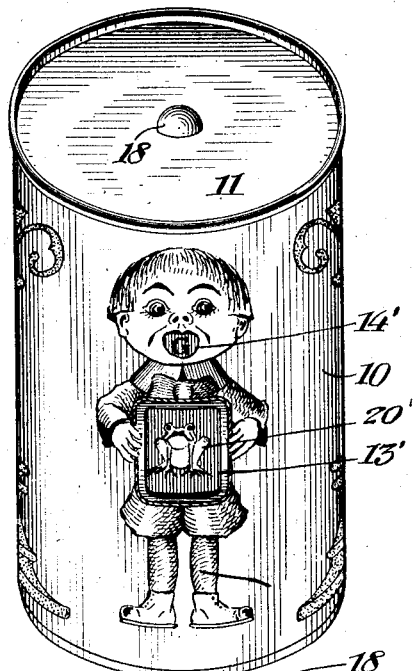
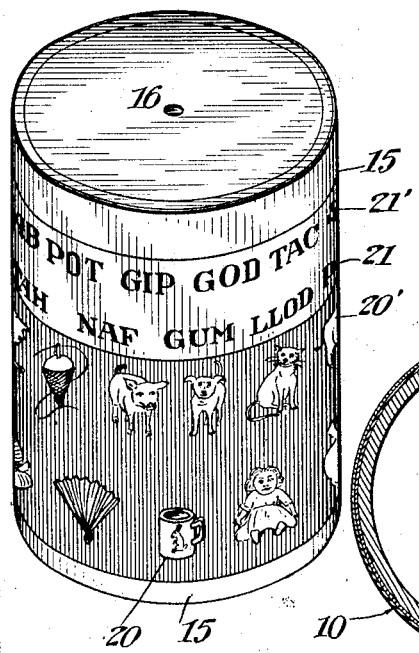
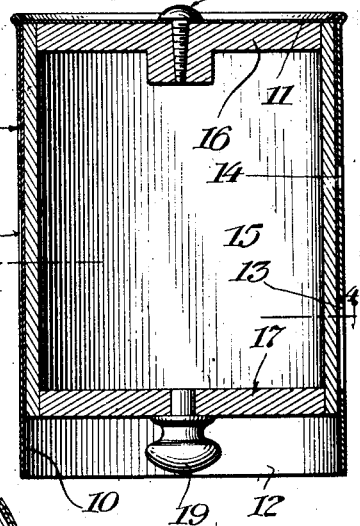
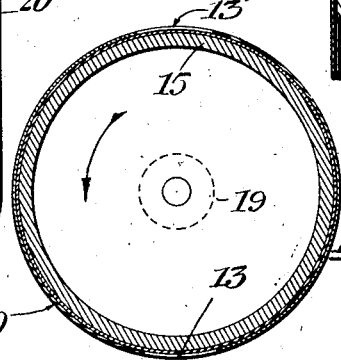

PETER S. H. NEWELL, OF LEONIA, NEW JERSEY, ASSIGNOR TO THE DIAMOND TOY CORPORATION, OF WILMINGTON, DELAWARE, A CORPORATION OF DELAWARE.

EDUCATIONAL TOY.

1,378,893. Specification of Letters Patent. Patented May 24, 1921.

Application filed October 14, 1920. Serial No. 416,838.

*To all whom it may concern:*

Be it known that I, PETER S. H. NEWELL, a citizen of the United States, and resident of Leonia, in the county of Bergen and State of New Jersey, have invented certain new and useful Improvements in Educational Toys, of which the following is a specification.

This invention relates to educational toys intended more especially for children; and the object of my invention is to provide a simple, convenient, attractive and instructive device whereby a succession of figures or pictures representing animals or objects of various kinds can be individually presented to view, together with the letters in sequence of the name of each animal or object thus presented in picture form; thereby not only exhibiting to the child the form and appearance of each animal or object of the series, but also the successive letters which spell the name of such animal or object.

In the preferred form of embodiment of my invention herein illustrated a cylindrical element having upon its periphery one or more circular series of spaced-apart figures or pictures of appropriate character and also one or more circular series of words designating the names of the respective figures or pictures, the corresponding names and pictures being in vertical alinement with each other, or substantially so, is rotatably mounted within a cylindrical casing having suitably-disposed lateral openings therein adjacent the paths of the respective series of pictures and names, whereby when the said element is progressively rotated on its axis the successive letters of each name are exposed to view, and at or about the same time, or upon the exposure of the final letter of each word, the picture of the animal or object so designated is also exhibited. Where a plurality of series of complementary names and pictures are employed on the movable element, the openings therefor are, by preference, so relatively arranged that one set of complementary pictures and names is exposed on one side of the casing and the other set of pictures and names is exposed on the other side of the casing; all as will be hereinafter more fully described. The precise scope of the invention will be defined in the appended claims.

In the drawings—

Figures 1 and 2 are perspective views of an educational toy embodying the principle of my invention, looking at opposite sides of the device.

Fig. 3 is a vertical section of the device.

Fig. 4 is a horizontal section of the same, on the line 4—4 of Fig. 3.

Fig. 5 is a perspective view of the rotary cylinder, detached.

Referring to the drawings, 10 designates a suitable casing comprising, in the present instance, a hollow cylinder closed at its upper end by means of a head 11, and open at its lower end, as at 12. In the wall of the casing are suitably-disposed pairs of sight openings 13, 14 and 13', 14', respectively, those of each pair being preferably in vertical alinement with each other. These openings are in different horizontal planes; those of one pair being in one side of the casing and those of the other pair in the opposite side of the casing. The upper openings 14, 14' are preferably smaller than their complementary lower openings 13, 13', respectively, for a purpose hereinafter mentioned.

15 designates a movable character bearing element comprising, in the present instance, a hollow cylinder or drum having upper and lower end heads 16, 17, respectively, which cylinder is mounted for rotation on its longitudinal axis within the casing. The upper end of the cylinder is rotatably and detachably secured in place by means of a screw 18 which is applied to a central aperture in the head 11 of the casing and entered in the adjacent head 16 of the rotatable cylinder, the lower end of the latter being provided with a central knob 19 to facilitate its manipulation.

On the circumference of the cylinder 15 are two circular series of spaced-apart figures or pictures, 20, 20', representing selected animals or objects of any kind or nature; such pictures being so located in reference to the openings 13, 13' that when the cylinder is rotated the lower series are caused to pass in front of the opening 13 and the higher series to pass in front of the opening 13'.

On the circumference of the cylinder, also, are two circular series of words, 21, 21', viz., the names of the respective animals or objects represented by the two series of pictures 20, 20′, respectively; the letters of each word being in vertical alinement, or substantially so, with the picture of the like named animal, &c. The letters are so located in reference to the openings 14, 14′ that the lower series of letters pass in front of the opening 14 and the higher series of letters pass in front of the opening 14′.

The sequence of the letters of each word and the location of each picture are such that as the cylinder 15 is gradually turned in one direction, (contra-clockwise in the present case) the letters are successively exposed at the openings 14, 14′, and the corresponding pictures are exposed at the respective underlying openings 13, 13′, the exposure of each picture being preferably had when the last letter of each advancing word has been presented to the adjacent opening. Thus if the cylinder be turned to advance the letters M–U–G successively to the opening 14 the picture of a mug will appear at the opening 13 simultaneously with the letter G at the opening 14, as illustrated in Fig. 1; and at the same time the letters spelling another word, as F–R–O–G, will be advanced to the opening 14′ and the picture of a frog will appear at the opening 13′, as indicated in Fig. 2. As the rotation of the cylinder is continued the letters of certain words, together with the complementary pictures, are exhibited at the respective upper and lower openings in the casing.

In order to add to the attractiveness of the device, I print or otherwise apply to the respective sides of the casing suitable pictures simulating a boy and girl, respectively, each with open mouth, as in the act of spelling, and each bearing the frame of a slate, for instance; the mouth of each bounding one of the openings 14, 14′ at which the letters appear, and the frame bounding one of the openings 13, 13′ at which each picture is exposed.

The educational advantages of a device embodying my invention are manifest, in that not only is a child enabled to see and spell the names but also to visualize the pictures of many different animals or objects.

While I have herein shown and described the device as provided with two rows of pictures and two rows of names in coöperative relation thereto, I may, of course, use a single row or three or more rows of pictures, and also correspondingly employ a single row or three or more rows of properly disposed names.

It is to be understood that my invention is not limited to the particular construction herein disclosed, as the device may be variously modified within the principle of the invention and the scope of the appended claims.

I claim—

1. An educational toy comprising a suitable casing having at least two-spaced apart sight openings therein, and an element mounted within said casing for movement in a continuous path, said element having on its face a row of figures or subjects and a corresponding row of names for the respective figures or subjects, the two rows being so coördinated that as the said element is advanced the letters of a name are progressively presented to one opening and the correspondingly named figure or subject is presented to the other opening of the casing.

2. An educational toy comprising a cylindrical casing having at least two spaced-apart openings in one side thereof, said openings being in different horizontal planes, a cylinder rotatably mounted within said casing and bearing a circumferential row of figures of subjects in the plane of one opening, and a similar row of names in the plane of the other opening, the names being so disposed that the letters of each name are progressively presented to the adjacent opening and the correspondingly named figure or subject is presented to the other opening of the casing.

3. An educational toy comprising a cylindrical casing open at one end, and having at least two spaced-apart openings in one side, said openings being in different horizontal planes, a cylinder within said casing and pivoted in the closed end of the casing, said cylinder bearing a circumferential row of figures or subjects in the plane of one opening and a similar row of designating names in the plane of the other opening, the names being so disposed that the letters of each name may be progressively presented to the adjacent opening and the correspondingly named figure or subject presented to the other opening, and means on said cylinder for actuating the same.

4. An educational toy comprising a cylindrical casing having two pairs of openings in opposite sides thereof, said openings being in different horizontal planes, a cylinder rotatably mounted within said casing, and bearing four circumferential rows of characters in the planes of the respective openings, two of said rows comprising different figures or subjects and the remaining rows comprising the names of said figures or subjects, respectively, and the said rows being so correlated that corresponding names and figures or subjects may be progressively presented to the plural openings in each side of the casing.

Signed at New York, in the county and State of New York this 7th day of October, A. D. 1920.

PETER S. H. NEWELL.